United States Patent [19]
Helgesson

[11] 3,774,101
[45] Nov. 20, 1973

[54] OVERLAP CALCULATOR FOR CONVERTER RECTIFIER

[75] Inventor: Kjell Helgesson, Vasteras, Sweden

[73] Assignee: Allmanna Svenska Elektriska Aktiebolaget, Vasteras, Sweden

[22] Filed: June 22, 1972

[21] Appl. No.: 265,197

[52] U.S. Cl. .............................................. 321/45 C
[51] Int. Cl. ............................................ H02m 7/00
[58] Field of Search .................. 321/13, 27 R, 45 C

[56] References Cited
UNITED STATES PATENTS
3,536,985  10/1970  Ekstrom .............................. 321/13
3,358,211  12/1967  Ekstrom .............................. 321/35

*Primary Examiner*—William M. Shoop, Jr.
*Attorney*—Jennings Bailey, Jr.

[57] ABSTRACT

For calculating and indicating the commutation time for a pair of commutating rectifiers in a static converter, the load current value of the converter at the start of the commutation is stored in an integrating memory circuit. The commutation voltage is connected to the input of the memory circuit at the start of the commutation. The integrated value of the commutation voltage is continuously subtracted during the commutation from the stored current value. The difference between the current values is continuously supervised, and a signal indicating the end of the commutation is emitted when such difference is indicated to have a predetermined value, which may be zero or the current value in question.

7 Claims, 4 Drawing Figures

OVERLAP CALCULATOR FOR CONVERTER RECTIFIER

BACKGROUND OF THE INVENTION

1. Field of the Invention

The present invention relates to a so-called overlap calculator for the rectifiers in a static converter, i.e. a means for calculating and indicating the time during which the current commutates from one rectifier to another and thus indicating the exact moment for the start and completion of the commutation. The invention also relates to the method of such calculation and indication.

2. The Prior Art

An overlap calculator may be used, for example, for a means for securing a certain margin of commutation in an inverter in order to give a certain indication of when the commutation is completed. The means may then also be used to indicate commutation errors or the risk of a commutation error in both rectifiers and inverters so that the necessary precautions can be taken in time. The use is not limited, however, to this and it may be of interest in other connections to know the phase position of the commutation process in relation to the alternating voltage of the converter. This may be the case for checking converters under construction as well as for periodic checkups or constant supervision of converters in operation. The overlap calculator is also of great importance in the laboratory where converters or converter models are being studied and the commutation progress is to be checked.

The need for such overlap calculators has existed for a long time and there have been various types. However, while it is easy to get an indication of the start of the commutation which is marked by the emission of a control pulse to the firing rectifier, it is considerably more difficult to obtain an exact indication of the end of the commutation. This is marked partly by the dropping of the current in the extinguishing rectifier to zero, which happens over a continuous and rather smooth process, and partly by a voltage growing up over the rectifier in the blocking direction. This voltage increase is often considered in theory as a voltage leap but in practice this voltage leap is dampened by voltage dividers and damping circuits over the rectifier so that it gives no exact limit either. Furthermore, this transition stage must be transmitted from the high potential of the main circuits to low potential in order to be accessible to the control system, which requires expensive transmission circuits.

In means for securing a certain margin of commutation, therefore, other methods have been used to acquire a measurement of the real value of the commutation margin. According to U.S. Pat. Ser. No. 2,774,012 it is assumed that the commutation voltage is sine-shaped, and the integration value can therefore be acquired by phase-shifting the voltage 90° to a cosine voltage. According to U. Pat. Pat No. 3,536,985 a preliminary assessment of the integration value of the commutation voltage is made and this value is subsequently corrected by the real value. In both cases the real value of the margin of commutation or a corresponding parameter is calculated by subtracting a magnitude depending on the current from said integration value. The moment for the end of the commutation calculated in this way will therefore be dependent on the difference between two relatively large and not particularly accurate magnitudes, and the accuracy will therefore be considerably poorer for the difference than for the two magnitudes individually.

SUMMARY OF THE INVENTION

The present invention is also based on a measurement of the current in the converter and an integration of the commutation voltage, but in this case it is always the real values of the current and commutation voltage which are used without assuming anything about how these magnitudes may alter. Considerably greater accuracy can therefore be expected in the subsequent comparison between current and voltage integral. The overlap calculator according to the invention is therefore constructed with an integrating memory circuit and a comparison member with a signal transducer which includes a first measuring member for the load current of the converter, which is connected prior to the start of the commutation of the memory circuit. A second measuring member for the commutation voltage is connected during the commutation to the memory circuit. The comparison member includes means to compare the difference between the current value and the integrated value of the commutation voltage with a predetermined value and to emit a signal when the difference between the predetermined value and the difference are equal.

BRIEF DESCRIPTION OF THE DRAWINGS

The invention and its application will be further described with reference to the accompanying drawings in which FIG. 1 shows purely schematically a converter, whereas

DESCRIPTION OF THE PREFERRED EMBODIMENTS

Figure 1:
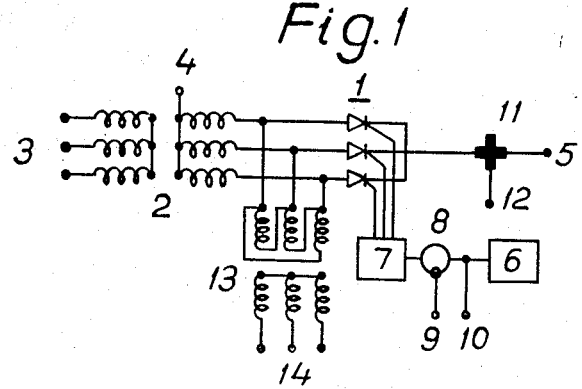

FIG. 1 shows a converter comprising a valve connection 1, a converter-transformer 2, alternating current connections 3 and direct current connections 4, 5. The valves are controlled by a control device 6 which emits pulses to a pulse device 7 which distributes control pulses to the various valves 1. The pulses from 6 to 7 are transmitted over a coupling member 8 with the help of which 6 can be blocked from 7 by a blocking signal on the control inlet 9 of the coupling member 8 which will be described later. The pulses from 6 can be taken out over a terminal 10 to control the connection in FIG. 2.

The load current of the converter is measured by a transducer 11 with the output terminal 12. The commutation voltages of the various rectifier pairs are taken out over a voltage-transformer 13 having a D-connected primary winding and a Y-connected secondary winding. In this way, the voltage from each of the terminals 14 will corresponding to the commutation voltage for one rectifier pair.

Figure 2:
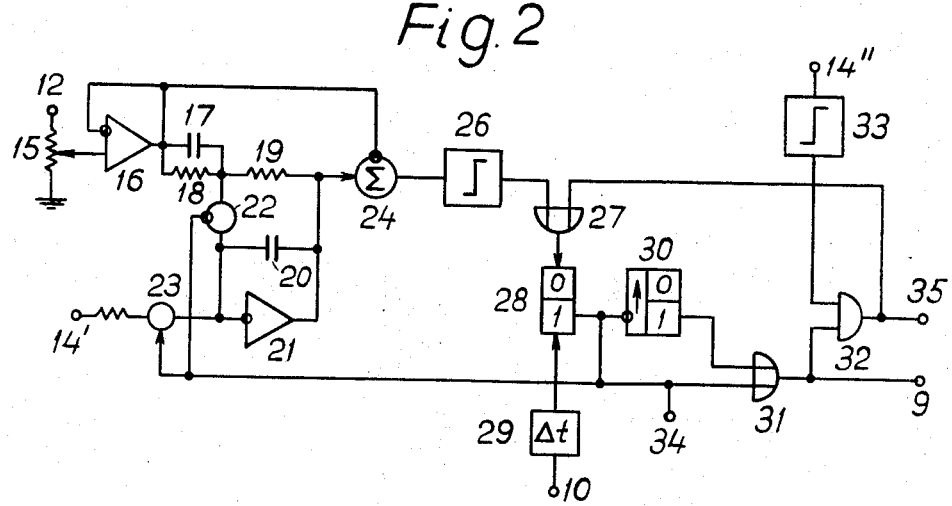
FIG. 2 shows an overlap calculator according to the invention.

As mentioned, FIG. 2 shows an overlap calculator according to the invention for a commutating rectifier pair in FIG. 1. In order to acquire an exact calculation, one must start with the practical conditions during the commutation process, which are that the entire load current must commutate over from the extinguishing rectifier to the igniting rectifier. This may also be understood as meaning that a commutating current grows up in the commutation circuit consisting of the extinguishing rectifier, the igniting rectifier and the corresponding two phases of the converter-transformer. The commutating current grows up in the conducting direction of the igniting rectifier and the blocking direction of the extinguishing rectifier and the commutation is complete when the commutation current is equal to the load current. What causes the commutation current to increase is the commutation voltage which is composed of the two corresponding phase voltages over the converter-transformer, i.e. the main voltage over the two phases. In order to make the commutation current increase to the same value as the load current, a certain voltage time integral is required which is determined by the equation $$\int U_k \, dt = K \cdot I$$

where $U_k$ is the commutation voltage, $I$ the load current and $K$ indicates the reactance in the commutating circuit.

In FIG. 2 connection terminals have been indicated by the same numerals as the corresponding terminals in FIG. 1. FIG. 2 comprises as integrating memory circuit 20, 21 which can be connected by means of the coupling members 22, 23 to the load current value of the converter over the terminal 12 or to the appropriate commutation voltage over the terminal 14' corresponding to one of the terminals 14 in FIG. 1.

The load current value from the transducer 11 in FIG. 1 is connected over the terminal 12 to the potentiometer 15 in FIG. 2 and by adjusting this a value is taken out which corresponds to the magnitude $K \cdot I$ in the above equation. The potentiometer 15 is connected to an amplifier 16 which through the feedback connection shown, indicates a signal $e_{16}$ (FIG. 3) which follows the signal from 15 irrespective of the load on the amplifier 16. On the ouptut side of 16 is an input circuit 17, 18 for an amplifier 21 with feedback circuit 19, 20. By making the resistors 18, 19, as well as the capacitors 17, 20, the same size the output signal $e_{21}$ from 21 will be made to follow the output signal $e_{16}$ from 16, but with opposite polarity. This is the case as long as the connecting member 22 is conducting and 23 is non-conducting. When 22 is non-conducting, the amplifier 21 and the feedback capacitor 20 form a memory circuit for the signal $e_{16}$ and when 23 becomes conducting 20, 21 at the same time form an integrating amplifier for the commutation voltage $e_{14}$. Until the moment of a control pulse from the device 6 in FIG. 1 over the terminal 10, the member 22 is conducting and the output voltage $e_{21}$ from the amplifier 21 follows the ouptut voltage $e_{16}$ from the amplifier 16O When a control pulse is emitted from 6, this control pulse 6 is fed over the terminal 10 and a delay device 29 to the switch 28. The device 29 gives a time delay $\Delta t$ which corresponds to the firing delay of the rectifier depending on the delay in the firing circuits so that the signal $e_{29}$ corresponds to the actual starting time of the commutation.

As mentioned above, the integrating circuit 20, 21 is provided with two input switches 22 and 23 which cannot be conducting simultaneously. If switch 22 is conducting, the whoel circuit 17-21 will function as a reverse voltage follower to the output of amplifier 16. If switch 23 is blocked, 20, 21 is isolated from 17-19, and there is an amplifier 21 with a capacitive feedback circuit 20. Such an amplifier forms a memory circuit storing the signal which was connected to it before the switch 22 was blocked.

If, on the other hand, a second signal is connected to the input of such a circuit 20,21, for instance over switch 23, the circuit will function as an integrating circuit for this second signal independent of a first signal stored in the circuit. However, on the output from 20,21, the first stored signal and the integral of the second signal will be added to or subtracted from each other dependent on the signs of these two signals. The first stored signal thus gives an initial level for the integration of the second signal.

Figure 3:
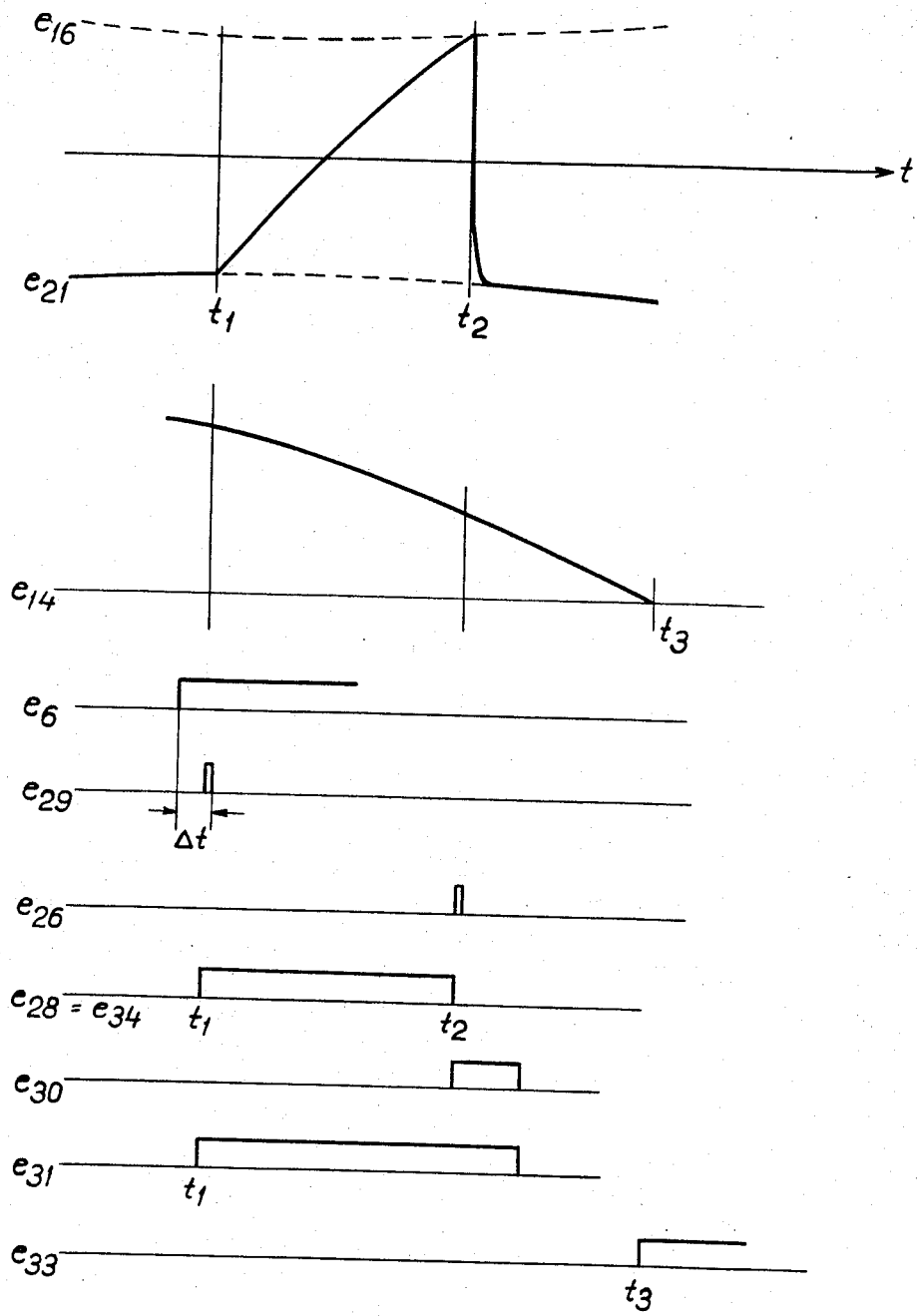
FIG. 3 shows curves of the various voltages or signals for the connections according to FIGS. 1 and 2.

The various voltages or the signals $e_n$ — where the index $n$ corresponds to the appropriate component $n$ in FIG. 1 or 2 — are shown in FIG. 3. Up to the moment $t_1$ the initial voltage $e_{21}$ (unbroken line) from the amplifier 21 with opposite polarity accompanies the voltage $e_{16}$ (broken line) from the amplifier 16 which indicates the load current value, represented by the upper curve system. At the moment $t_1$, the signal $e_{29}$ will set the switchover device 28 at signal 1, whereupon the member 22 is made non-conducting and 23 becomes conducting. The memory circuit is thus switched from load current value to commutation voltage which, via the terminal 14', is connected with such polarity in relation to the signal stored in 20, 21 that the integral of the commutation voltage is subtracted from this stored signal. At the moment $t_1$, the load current is $I_1$, the signal $e_{16}$ from the amplifier 16 is $K \cdot I_1$ and the signal $e_{21}$ from 21 is $-K \cdot I_1$. These two signals are connected with opposite polarity to a summator 24, the output signal of which is thus $2 \cdot K \cdot I_1$ at the moment $t_1$. Thereafter the commutation voltage in the circuit 20, 21 is integrated, the output signal increasing from the negative value $-K \cdot I_1$ to a positive value. When at the moment $t_2$ this value reaches the value of the load current in question, $K \cdot I_2$, the signal from 24 will be zero, whereupon the discriminator or comparator 26 emits a signal $e_{26}$ which, via an OR-gate 27, sets the switchover means 28 at zero and the output signal $e_{28}$ becomes zero. 23 is then made non-conducting and 22 becomes conducting again.

If the signal $e_{28}$ is withdrawn from a terminal 34, a signal is thus obtained which clearly and distinctly indicates the overlap between the conducting intervals of the two rectifiers concerned, which overlap indicates the commutation time.

The magnitudes which appear in the summator 24 will be the time integral of the commutation voltage, the initial value $I_1$ of the load current and the real value $I$. At the completion of the commutation the equation will be $$\int_{t1}^{t2} U_k \cdot dt = K \left( \frac{I_1 + I_2}{2} \right)$$

where the righthand side will indicate the average value of the load current during the whole interval.

Figure 4:
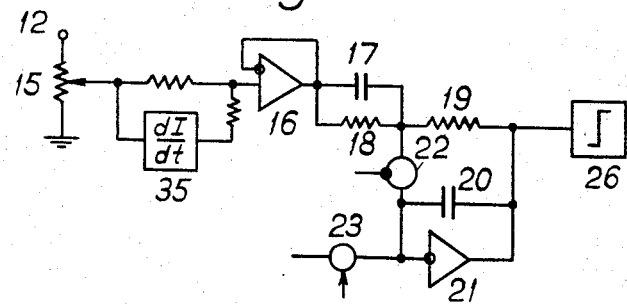
FIG. 4 shows a variation of the overlap calculator according to FIG. 2.

The connection can be simplified somewhat as indicated in FIG. 4 where the summator 24 has been omitted. In this case only the initial value of the current is used and in order to take into account any variations in the current, a derivation member 35 has been introduced, the signal $dI/dt$ of which is added to the current value $I_1$. The equation will then be $$\int_{t1}^{t2} U_k dt = K\left(I_1 + k\frac{dI}{dt}\right)$$

It can be seen that if the current variation is linear, the result will be the same in both cases.

The signal $e_{28}$ or $e_{34}$ may be used, as mentioned, for observation purposes which is in itself a valuable result. However, besides this some more pratical uses will be suggested in the following.

As mentioned previously, the control device 6 can be blocked from the pulse device 7 by means of the coupling member 8 through a blocking signal on the terminal 9. The output signal $e_{31}$ from the OR-gate 31 in FIG. 2 is connected to this terminal 9. As can be seen from FIG. 3, the signal $e_{31}$ is composed of the signal $e_{28}$ from the switchover device 28 and a second signal $e_{30}$ from a second switchover device 30. The input side of this switchover device is connected with inverted input to the output side of 28 and the switchover device 30 is monostable, which means that it emits a brief signal after the signal $e_{28}$ has become zero. The length of the signal $e_{30}$ has been chosen equal to the recovery time for the current rectifiers 1 in FIG. 1. In this way, therefore, the control device 6 will be blocked from the pulse device 7 both during the actual commutation time and during the subsequent recovery time for the extinguishing rectifier. An additional control pulse during this period would certainly cause some sort of ignition error.

FIG. 3 shows also the curve $e_{14}$ for the commutation voltage, which passes zero at the moment $t_3$. If the commutation should be initiated so late that the signal $e_{31}$ has not had time to become zero until the moment $t_3$, this means that the commutation voltage will change polarity before the extinguishing rectifier has recovered, thus involving a risk of the rectifier re-firing. How great this risk is depends on how narrow the margin $e_{30}$ for the recovery time has been chosen. To ascertain whether there is a risk of re-firing, the signal $e_{31}$ has been connected to one input on an AND-gate 32, to the other input of which is connected the corresponding commutation voltage over a terminal 14″ and a discriminator 33. This means that a signal $e_{33}$ is emitted to 32 from 33 after the moment $t_3$. If then the signal $e_{31}$ still remains, a signal will be emitted from 32 over the output 35, which signal can be used as an indication of a commutating fault and in order to take the required steps in view of this.

The overlapping of the signals $e_{31}$ and $e_{33}$ means, inter alia, that the output at 14′ will be zero before the integrator 21 has finished its integration, and therefore no signal $e_{28}$ will be emitted. In order even in such a case to set the switchover device 28 at zero and thus switch the members 22, 23 so that the circuit is ready for the next calculation, the output from the AND-gate 32 has been connected to the switchover device 28 over the OR-gate 27 parallel to 26. In this way the error signal from 32 will return the circuit to its initial position.

The signal from 32 may even be used in an inverter in order to temporarily increase the prescribed commutation margin so that it is easier to return the inverter to normal operation after a commutation fault.

As the arrangements in FIGS. 2 and 4 have been described, each arrangement is only imagined as operating for one rectifier pair. However, by connecting the terminals 14′ and 14″ over suitable distribution members to the terminals 14 in FIG. 1, one and the same overlap calculator can be used for the rectifiers in all phases of the converter.

I claim:

1. Method of calculating and indicating the commutation time for a pair of commutating rectifiers in a static converter, which comprises storing the load current value of the converter at the start of the commutation in an integrating memory circuit, connecting the commutation voltage to the input of the memory circuit at the start of the commutation, continuously subtracting the integrated value of the commutation voltage during the commutation from the stored current value, continuously supervising the difference between said current value and said integrated value, and emitting a signal indicating the end of the commutation when said difference is equal to a predetermined value.

2. Method according to claim 1, which includes adjusting the integration of the commutation voltage so that the commutation is completed and said signal emitted when said difference is zero.

3. Method according to claim 2, which includes correcting the load current value by adding a value representing the time derivative of the current value.

4. Method according to claim 1, which includes adjusting the integration of the commutation voltage so that the commutation is completed and said signal emitted when said difference is equal to the current value in question.

5. Means for calculating and indicating the commutation time for a pair of commutating rectifiers in a static converter, which comprises an integrating memory circuit and a comparison member with a signal transducer, a first measuring member for the load current of the converter, means for connecting said memory circuit prior to the start of the commutation of said first measuring member, a second measuring member for the commutation voltage, and means operable during the commutation for connecting said memory circuit to said second measuring member, the comparison member including means to compare the difference between the current value stored in the memory circuit and the integrated value of the commutation voltage with a predetermined value and to emit a signal when these two values are equal.

6. Means according to claim 5, in which said predetermined value is zero.

7. Means according to claim 5, in which said predetermined value is equal to the real value of the load current.

* * * * *